United States Patent Office 3,466,221
Patented Sept. 9, 1969

3,466,221
EXPANDED SILICATE INSULATION
Robert H. Sams, Aldan, and Newton W. McCready,
Newtown Square, Pa., assignors to Philadelphia
Quartz Company, Philadelphia, Pa., a corporation
of Pennsylvania
No Drawing. Filed Apr. 5, 1966, Ser. No. 540,204
Int. Cl. B32b *3/30, 5/18;* C09j *1/00*
U.S. Cl. 161—133           7 Claims

ABSTRACT OF THE DISCLOSURE

This improvement comprises a continuous mass of intumesced alkali silicate reinforced with inorganic fibers and uniformly expanded by reaction of finely divided Si and its alloys and set at its optimum expansion by reaction with finely divided sodium fluosilicate.

THE PROBLEM

The polystyrene resins are widely used to form insulating foams in situ, they are lightweight and readily maintain their form. However, they are not rigid and are of course not innately resistant to heat and fire damage often failing at temperatures of 200° F. For wall panels, cold storage vaults and refrigerated railroad cars it is important not only to have good heat insulation but also that the foam be rigid, fire-resistant and water-resistant. Therefore, a considerable demand has been generated for a product to replace the polystyrene resin in such products. The use of rigid foams of silicate for airdrop cushioning and also for insulated shelters with the panels ready to be expanded into rigid forms in situ has been suggested. The foams may be used for the preparation of artificial boulders or hummocks for camouflage.

Provision of such insulating foams through the property of intumescence by which a body of soluble alkali silicate expands many times in volume on rapid heating and solidifies by drying around the bubbles of steam generated therein is well-known and many attempts at exploitation have been made over the last fifty years. Some products have reached a stage of at least temporary consumer acceptance but by and large there has been no continuing commercial exploitation such as its proponents have envisioned.

We believe that this has occured because the use of the ordinary silicates of commerce has been difficult to control and the compressive strength is too low for most applications. A certain amount of predrying is required for optimum expansion into a body. It is difficult to obtain the voids of rather uniform size for the highest insulating effects. It is also difficult to obtain even or equal dispersion of heat throughout the mass as the silicate first intumesces at the hottest point and thereby tends to insulate the rest of the body from the necessary rapid rise in temperature. Furthermore, we have found that it is important to control the ratio of $SiO_2$ to $Na_2O$ in the alkali silicate itself to obtain optimum expansion without subsequent deflation by escape of the steam before the film is strong enough to maintain its foam and prevent rupture by the hot gas.

It has been known to use various additives and reactants to increase resistance of the expanded product to weather and water. In this connection one must avoid reactions which result in a silica gel or other than amorphous alkali silicate film of proper viscosity. Many additives have been tried and suggested, usually without the desired results and with an increase in final density.

The properties required in a composition to be used for forming isolated particles of expanded silicates and those needed for expanding a block in place are found to be different primarily because of the difference in the heating which may be applied and the need to maintain a regular void size throughout the mass. Thus while the art of expanded particles may be suggestive, it is by no means a guide to development of continuous expanded films in layers.

The persistent attempts to find a commercially acceptable foam based on the soluble silicates are understandable in view of the low cost of the initial material and its ability to expand to a very lightweight material having a thermal conductivity as low as 0.029 B.t.u./sq. ft./in./° F. It is therefore satisfactory not only for thermal insulation but also for acoustical insulation. It is naturally resistant to heat, fire and vermin, and is little affected by age or vibration. While the highly expanded, unimproved alkali silicates are quite friable, the resistance to compression may be increased substantially and at the same time the elasticity will be increased. The product not only lacks a noticeable odor but will not fume when heated. Another important property is that these soluble silicates are non-corrosive to aluminum or iron since they are alkaline and the alkali silicate is non-corrosive to metals. Moisture resistance may be increased by dehydration or by the addition of additives, and the density may be varied over a wide range.

PRIOR ART

A detailed review of the literature disclosed no completely inorganic expanded silicate having a substantial thickness, uniformly cellular and lightweight throughout, strong, insoluble, heat-resistant and yet economical.

In the prior art there have been numerous attempts to prepare such expanded silicate films containing voids of controlled diameter. Many of these have used foaming agents such as soap or organic surfactants but these of course require a certain amount of beating or stirring in order to develop the foam and it is difficult to maintain the foam at the optimum size once it is reached; that is it is difficult to set the film at its optimum condition without adding some reactant which forms a gel or other structure which lacks the strength of the soluble silicate film. The organic residue is also a source of fumes at high temperatures. It also has been suggested to prepare mixtures of alkali silicates with a filler such as dolomite, and in some cases the decomposition of the dolomite on strong heating has been used to bring about an expansion but, again, there is a reaction between the $CO_2$ from the decomposition and the alkali silicate.

There are a number of prior art patents which include the addition of silicon to help the alkali silicate to set, but these do not foresee the problems of bringing about a proper expansion to develop an insulation material. There are of course many patents showing the reaction of a silicofluoride and other reagents with the sodium silicate as a binder in order to develop water resistance but these, again, do not apply to inorganic lightweight insulation.

Perhaps the closest patent is Patent No. 3,136,645 which shows the use of sodium fluosilicate to set a sodium silicate as a gel in the presence of a cationic agent to maintain the foam. Silicon may be added to develop a gas which will stir the mixture into a foam but no equivalent of asbestos fiber is included in this composition and the reaction product is weak unless large amounts of silica, which increase the density, are added. In Patent 3,184,371 asbestos is added to improve the mechanical properties of isolated intumesced silicate particles which must be predried to 10% water, an art which has problems different from those we face here.

It is also known from the prior art that heating to intumesce a silicate film causes over-expansion in part of the film and under-expansion in other parts. That part which is over-expanded tends to be weak because of the thin films formed by over-expansion. We have found that by the use of silicon an even but minimal expansion of about three times can be obtained which leaves a strong film. Heating tends to expand the alkali silicate by 10 or more times.

OUR INVENTION

We have now found and developed a composition which overcomes many of the difficulties encountered by the prior art. We have found in the first place that it is necessary to use an alkali silicate having an $SiO_2:Na_2O$ ratio of about 2.5 to 3.2. We use this in a proportion of about 80 to 90%. In order to strengthen the film and control the void size, we add 3 to 6% of fine asbestos fiber, and in order to avoid the problem of expansion by uneven heating we have found that we may add a small amount of Si or a comparable alloy, e.g. 0.2–0.6%, at 100–400 M. However, while the reaction of the silicon takes up some water and raises the temperature in forming additional sodium silicate and the hydrogen gas will increase the volume about 3 times, there is not sufficient dehydration of the silicate to hold the volume at the optimum. We have found that 6–15% added sodium silicofluoride will maintain the expansion. We have found that other silicofluorides are too rapidly soluble to be effective in this application. Since they are so rapidly reactive they tend to form a silica gel and destroy the alkali silicate film which is necessary for the optimum strength.

Finally, when air dried the product has a density of about 15–30 lbs./cu. ft. and a compression resistance of about 100–120 p.s.i.

In carrying out the expansion of this product, we find that it is sometimes useful to heat a small portion, or section, of the original film to a temperature of about 25 to 50° C. in order to initiate the exothermic reaction which causes the expansion throughout the film or mass. Otherwise it may be necessary to wait for a time, which may be up to several hours, until an induction period has been completed during which the internal temperature has risen sufficiently to start the more rapid reaction.

EXAMPLES

In the following examples the silicon powder was a finely divided powder of about 300 to 400 mesh obtained from Electrometallurgical Co.

The asbestos fiber is acid-washed Powinco Asbestos Fiber obtained from Arthur H. Thomas Co.

The diatomaceous earth is Celite #503 from Johns-Manville.

The following sodium silicates were obtained from the Philadelphia Quartz Company:

"S–35"—a sodium silicate having a ratio of 3.75 $SiO_2/Na_2O$ with 6.75% $Na_2O$.
"N"—a sodium silicate having a ratio of 3.22 $SiO_2/Na_2O$ and about 8.9% $Na_2O$.
"RU"—a sodium silicate having a ratio of about 2.4 $SiO_2/Na_2O$ and about 13.9% $Na_2O$.
"K"—a sodium silicate having a ratio of about 2.9 $SiO_2/Na_2O$ with about 11.0% $Na_2O$.
"Metso Granular"—sodium metasilicate 5-hydrate.
"Metso 99"—a sodium sesquisilicate 5-hydrate powder having a ratio of 2 $SiO_2/2.9$ $Na_2O$.

The sodium silicofluoride was obtained from Harshaw Chemical Co. and had a particle size of less than about 65 M.

Example 1

Various attempts were made to obtain a foam which could be set in the expanded condition using surface active agents and reactive materials such as a silicofluoride or plaster of Paris to solidify the foam. A number of organic blowing agents, such as ethylene carbonate and dinitroso pentamethylene tetramine were tried as well as postassium borohydride. No satisfactory expanded products were obtained. Finely powdered aluminum will react with caustic soda. However, it did not react rapidly with siliceous silicate pastes and no known catalyst would produce the expansion. Magnesium powder failed to react and evolve sufficient hydrogen, even with the addition of a catalyst such as 0.1% palladium chloride. Zinc dust also reacts too slowly to offer the possiblity of its use as a cellulating agent. However, a fine grade powder of silicon such as was obtained from Electrometallurgical Co. reacts sufficiently quickly with silicieous sodium silicate solutions to expand the thickened silicate. This reaction can be encouraged by increasing the temperature, by some dilution, and by increasing the alkalinity of the solution. Naturally, the more finely divided the silicon product the more rapid the reaction.

(a) A mixture of 86 parts of "S–35" sodium silicate, 3.5 parts of asbestos fiber and 0.5 part of a silicon powder was stored at room temperature and examined after 24 hours. Another part was stored at 90° C. in an oven. Each gram of silicon powder will consume 1.3 grams of water and evolve 2500 calories of heat and 1.580 milliliters of gaseous hydrogen under standard conditions. Thus 0.5 part of silicon in 90 parts of paste could have expanded the paste to 12½ times the original volume. At room temperature the film expanded to only about 3 times its original volume whereas the portion heated at 90° C. had expanded and then collapsed.

(b) Attempts to add other thickening agents, such as bentonite clay, were not successful. More reactive materials such as zinc silicofluoride caused the paste to set too quickly without the development of a uniform cellulation. Of the many reactive materials tried, only sodium silicofluoride seemed to be satisfactory because of its low solubility and reactive capacity. The particle size affects the reactivity and must be considered. Without the addition of asbestos fibers, the expanded mass would not hold its shape until it became rigid. Also, a very siliceous silicate such as "N" (3.2 $SiO_2:Na_2O$, sold by Philadelphia Quartz Co.) caused the silicon to react too slowly to give good cellulation, whereas the "RU" silicate (ratio 2.4 $SiO_2:Na_2O$, also sold by Philadelphia Quartz Co.) was so alkaline that the silicon reacted too quickly and the paste was not solidified but remained soft. "K" sodium silicate having a ratio of 2.9 $SiO_2:Na_2O$ at 47° Baumé (sold by Philadelphia Quartz Co.) gave the most satisfactory results and the addition of 0.3% of silicon powder provided the optimum expansion (i.e. full expansion without significant collapse of the pores). 6 to 12% of sodium silicofluoride was the most effective in converting the paste to a rigid product without excessive gelation and neutralization. Moreover, such a film can be made to any layer thickness desired with a density of about 50 lbs./cu. ft. or less. After forming, the films may be further dried in the air or in an oven or, preferably, by the use of infrared heat. The use of a radar or microwave oven or of solar heat is suggested. Electrolytic heating or resistance heating may also be practical. On the other hand, water absorbents such as raw starch or hydratable inorganic salt may be added to the composition. Furthermore, organic ammonium silicates may be added to the alkali silicate and heating to higher temperature will remove the ammonia leaving a product with higher silica content and more resistance to weathering.

(c) A mixture of 87.85% of "N," 0.15% silicon, 2% asbestos fiber and 10% of sodium silicofluoride required 2 hours to begin expanding at room temperature. When heated to 40° C., it began expanding and reached a maximum of 1.5 times its original volume in 1 hour. A more alkaline silicate, "RU," expanded to 1.25 times its original volume in a half hour and to 4 times its volume in 1.5 hours but the product was soft and gummy. The addition of clay did not bring about the desired solidification. With "K," however, the mixture expanded to 150% in 1.5 hours. When warmed at 45° C., it expanded almost 150% in 1.25 hours, that is about the same amount, and became rigid without water loss. With 82.7% "K," 0.3% of silicon powder, 5% of asbestos fiber, and 12% of sodium silicofluoride the final product retained 4 times its original volume after reaching 4.5 times its original volume in 3 hours. Drying at ordinary conditions of 73° F., 50% relative humidity, 29% of the weight was lost in 2 days without causing extensive shrinkage.

Example 2

(a) An expandable paste was prepared using 82.7% of "K" sodium silicate, 5% of asbestos fibers, 0.3% of silicon metal powder and 12% of sodium silicofluoride powder. This formed a gray, fibrous mush which became piable enough to be molded like clay in about 45 minutes. After about 30 minutes the paste began to expand gradually, attained its maximum expansion of about 3 times the original volume in 2 hours and on standing overnight in a closed container without drying became rigid and dry to the touch. Under ordinary atmospheric conditions with 73° F. and 50% relative humidity it dried further, losing ⅓ of its weight in 5 days, without extensive shrinkage. If the freshly made paste was slightly warm the reaction was of course much more rapid but the final product was less uniformly cellular and was somewhat more dense since hydrogen could escape more readily.

Cellular test blocks were made by pouring into a mold. Such a block having a diameter of 2 inches and 1 inch depth was air dried for 5 days. The original density of 28 lbs./cu. ft. was reduced to 20 lbs./cu. ft. and was further reduced to 15 lbs./cu. ft. by baking. The compression resistance at 0.4 inch was initially about 74 p.s.i. but on air drying became about 114 p.s.i. After soaking and baking at 150° F. for 24 hours this was somewhat reduced to about 94 p.s.i.

Compression resistance has been tested with a Thwing-Albert Tensile Tester having a round plunger with a surface area of 2 sq. in. The force required to press this plunger 0.4 inch into the foam has been measured as the compression resistance.

If a more finely powdered sodium silicofluoride was used less was required and the blocks were lighter and stronger.

(b) In one case such a paste was applied to the exterior of an iron pipe and allowed to expand and harden to form a strong, adherent layer of insulating coating. Since the coating is alkaline the pipe is protected against corrosion.

(c) A B-flute singleface board was bonded to a kraft liner using "N" silicate as the adhesive. The bond was formed at 350° F. on a hotplate for 15 seconds. Similarly, the above composition of "K" silicate, silicon, etc. was rolled out as a coating on the kraft liner and the coated kraft liner was applied to the singleface under the same conditions except that it was heated for 1 minute in contact with the hotplate. The paste served not only to bond the liner to the singleface but to fill the flute spaces with a porous silicate structure. These board samples were conditioned at the usual 73° F. and 50% relative humidity for several days. With the "N" silicate adhesive, the board collapsed under a load of 210 lbs. in the flat crush test using 4½ sq. in. sections. The paste sample was a porous silicate structure and was compressed only about 33% at the 210 lb. load and 55% at 500 lbs. maximum load of the testing equipment. When stored for 3 days at 93% relative humidity and tested while damp, the "N" bonded board crushed at 120 lbs. whereas the special board was compressed only 50% at 260 lbs., and still only 85% at 500 lbs. The treatment did not stain the liner.

The use of metal screening or dry porous felt to hold the board tightly against the hotplate permitted moisture to escape freely without causing excessive warping or staining. The paste product was much more rigid than the usual corrugated board.

The working life of the paste compound may be varied by variation in the fineness of the sodium silicofluoride and the concentration used. The paste may also be diluted and the asbestos fiber content varied.

(d) A laminated insulating board was also prepared by rolling out the partially thickened paste into a uniform layer on a paper liner and covering it with a second sheet of liner paper and placing the sandwich on a hotplate under a grille adjusted so the paste could expand to 3 times its original thickness before meeting restraint. Such a cellular board could be prepared with facings of liner paper, asbestos, aluminum screening, etc. The paste consisted of 86% of "S-35", 3.5% of asbestos fiber, 0.5% of silicon powder and 10% of Celite diatomaceous earth and developed a thin, flaky structure.

A layer 0.035 inch thick of the mixed paste was spread across a facing of kraft liner and a similar liner was placed on top. The sandwich was then placed on a 350° hotplate for 2 minutes.

(e) A paste was prepared with 85.7% of "K," 5% of asbestos fiber, 0.3% of silicon, and 9% of a powdered sodium silicofluoride, technical grade, having a finer particle size. Expanded blocks were prepared as before, and this product initially had a density of 25 lbs./cu. ft. and when air dried had a density of only 16 lbs./cu. ft. Over 125 lbs. per sq. in. were required to compress this air dried product by 0.2 inch. When the asbestos was reduced to 3% and the "K" content increased to 87.7%, the compressive strength when wet was much less than that for the previous composition, but on air drying its final density was 17 lbs./cu. ft. and over 125 p.s.i. were required to compress the expanded product 0.2 inch. By increasing the silicon content only 0.2% over that of the first paste, the air dried density was 18 lbs. per cu. ft., but the compressive strength was greater than the maximum machine reading of 125 p.s.i. at only 0.1 inch.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What is claimed is:

1. A mass of expanded alkali silicate insulation consisting essentially of 80 to 90% of a sodium silicate having an $SiO_2:Na_2O$ ratio ranging from about 2.5 to 3.2; about 3 to 6% of asbestos fiber; about 0.2 to 0.6% of silicone metal; and about 6 to 15% of sodium silicofluoride, the mass being expanded to about three times its original thickness and air dried to form a product having a density of about 15 to 30 lbs./cu. ft. and a compression resistance of about 100 to 120 p.s.i.

2. The process of forming the product of claim 1 in which about 80 to 90% of a sodium silicate having an $SiO_2:Na_2O$ ratio of about 2.5 to 3.2 is mixed with about 3 to 6% of asbestos fiber; 0.2 to 0.6% of silicon metal having a particle size in the range of about 100 to 400 M; and 6 to 15% of sodium silicofluoride in which the expansion is initiated by heating at least a portion of the composition to about 25–50° C.

3. The process of claim 1 in which the internal heating is initiated by an induction period of between about 30 minutes and several hours.

4. The product of claim 1 which also contains borax.

5. The product of claim 1 which also contains sodium acid phosphate.

6. A corrugated board filled with the product of claim 1.

7. A laminated board bonded with the product of claim 1.

References Cited
UNITED STATES PATENTS 3,136,645  6/1964  Dess _____ 106—40 X LEON ROSDOL, Primary Examiner I. GLUCK, Assistant Examiner U.S. Cl. X.R.

106—40, 75, 84; 117—123; 135.1; 161—159; 252—62